(12) United States Patent
Chalve

(10) Patent No.: US 9,132,604 B2
(45) Date of Patent: Sep. 15, 2015

(54) THERMAL PANEL

(76) Inventor: Pablo Andrade Chalve, Col. Ciudad Brisa (MX)

( * ) Notice: Subject to any disclaimer, the term of this patent is extended or adjusted under 35 U.S.C. 154(b) by 283 days.

(21) Appl. No.: 13/594,836

(22) Filed: Aug. 26, 2012

(65) Prior Publication Data

US 2014/0017453 A1    Jan. 16, 2014

(30) Foreign Application Priority Data

Jul. 10, 2012    (MX) .................... MX/a/2012/008029

(51) Int. Cl.
| | | |
|---|---|---|
| *B32B 3/00* | (2006.01) | |
| *B32B 3/28* | (2006.01) | |
| *B32B 15/04* | (2006.01) | |
| *B32B 5/18* | (2006.01) | |
| *B32B 15/20* | (2006.01) | |
| *F16L 59/02* | (2006.01) | |
| *F25D 23/06* | (2006.01) | |

(52) U.S. Cl.
CPC ... *B32B 3/28* (2013.01); *B32B 5/18* (2013.01); *B32B 15/20* (2013.01); *F16L 59/02* (2013.01); *F25D 23/06* (2013.01); *F25D 2201/1282* (2013.01); *Y10T 428/24694* (2015.01)

(58) Field of Classification Search
CPC ............ B32B 3/28; B32B 5/18; B32B 15/20; B65D 65/403; B65D 81/386; B65D 29/08; B65D 81/3897; B65D 8/389; B65D 81/3823; B31F 1/28; E04C 2/322; E04C 2002/3444; E04C 2/32; F17C 3/04; F17C 13/001; F25D 2201/00; F25D 2201/12; F25D 3/08; F25D 2201/1282; F25D 23/06; F25D 2303/0822; F25D 2400/36; F25D 331/801; A45C 11/20; F16L 59/02; F16L 59/029

USPC ............ 428/182, 184, 186, 457, 36.91, 35.7, 428/35.8, 35.9, 36.5, 166, 178, 304.4; 52/783.1, 783.11, 783.17, 784.15, 52/784.14, 793.1, 794.1; 215/12.1, 12.2, 215/13.1; 220/560.12, 560.13, 560.15, 220/592.2, 592.21, 592.25, 592.26, 23.9, 220/495.03, 510, 529, 528, 549, 625, 918, 220/919; 383/110, 109, 111; 165/47; 252/70; 229/403, 103.11; 62/457.3, 62/457.1, 457.4, 457.5, 60, 371, 530; 426/393; 206/174, 178, 196
See application file for complete search history.

(56) References Cited

U.S. PATENT DOCUMENTS

| | | | | |
|---|---|---|---|---|
| 4,313,993 | A * | 2/1982 | McGlory ...................... | 428/178 |
| 4,883,196 | A * | 11/1989 | Kato et al. ............... | 229/103.11 |
| 7,240,513 | B1 * | 7/2007 | Conforti ...................... | 62/457.2 |

FOREIGN PATENT DOCUMENTS

| | | |
|---|---|---|
| CN | 20201581575 | 9/2010 |
| MX | A/2008/015664 | 8/2008 |

* cited by examiner

*Primary Examiner* — Catherine A Simone
(74) *Attorney, Agent, or Firm* — Jerry R. Potts

(57) ABSTRACT

The present invention refers to a thermal panel of thermal foam, characterized in that said thermal panel includes three isolating layers, in which the first layer, is an aluminized layer or film which serves as a film reflecting to temperature; the second layer, is a corrugated plastic sheet that serves as a temperature diffuser; and the third layer is an isolating foam plate, which serves to isolate any change of temperature in the environment.

12 Claims, 2 Drawing Sheets

THERMAL PANEL

This invention refers to a thermal panel, particularly, a panel made of with three isolating layers that oscillate from −20° C. to 120° C. for the preservation of food.

BACKGROUND OF THE INVENTION

In the present, there exist several portable items for the preservation of foods, mainly known as "coolers"; however, said items are still cumbersome and expensive.

There also exist the refrigerators used by restaurants for the preservation of food, but in the case of home delivery, they need to send food in trays or boxes transported by a vehicle at ambient temperature, which causes food to change its temperature, deriving in the consumer's displeasure.

The reinforcement of the present invention, is to provide preferably a thermal panel; particularly, a portable thermal panel made of thermal foam with three isolating layers oscillating from −20° C. to 120° C. for the preservation of food basically with a light weight.

Said thermal panel is used as a wall to be placed inside the containers, made either from fabric or vinyl, and might be adjusted to any size with the intention of thermally isolating, and transporting, and thereby preserve the temperature of its contents, either cold or hot in accordance with the temperature ranges that oscillate between −20° C. to 120° C.

Said panels may be placed inside a container, either rigid or flexible, in their use position in order to preserve the desired temperature of a product, and when the containers need to be cleaned or kept in their storage position, said panels need only to be removed from said container, thereby saving space, particularly for flexible containers such as bags or backpacks.

Likewise, the thermal panel provides resistance either to tension and/or compression; therefore, its physical properties are not altered, even under severe or rough use conditions.

BRIEF DESCRIPTION OF DRAWINGS

The aforementioned characteristics of the invention shall become evident after referring the following detailed description and the accompanying drawings, from which.

DETAILED DESCRIPTION OF INVENTION

The preferred modalities of the invention shall be described in detail below, with reference to the accompanying drawings.

Figure 1:
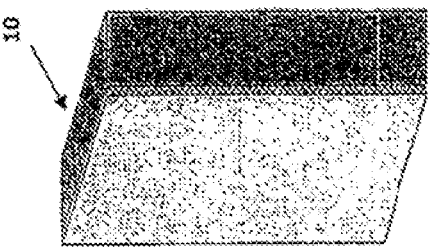
FIG. 1, is a view en perspective of the thermal panel in accordance with the present invention.
Figure 2:
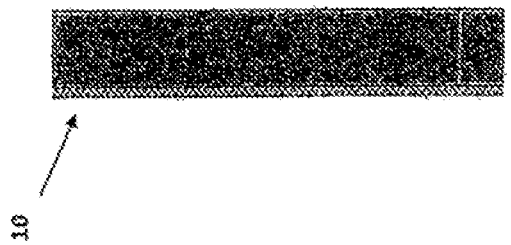
FIG. 2, is a side view of the thermal panel in accordance with FIG. 1.

FIGS. 1 and 2 show the portable thermal panel made of thermal foam (10) with three isolating layers at temperatures that oscillate from −20° C. to 120° C. for the preservation of foods, basically of light weight.

Figure 3:
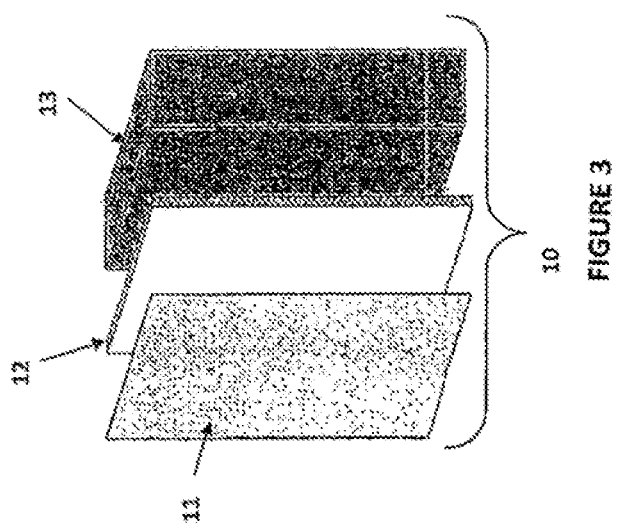
FIG. 3, is an exploded view of the thermal panel in accordance with the present view.

Said thermal panel (10) shall be used in a varied shape and thickness. FIG. 3 illustrates the thermal panel (10) on a exploded view with the intention of indicating the layers that compose the same. Said layers are related in the following manner:

The layer (11), is an aluminized layer or film that serves as a film reflecting to temperature. The layer (12), is a corrugated plastic sheet that works as a temperature diffuser. Finally, the layer (13) is an isolating foam plate, which isolates any change of temperature in the environment. On the other hand, the relation of the thickness that includes the isolating foam plate (13) with regard to the aluminized film (11) and the corrugated plastic sheet (12) is completely variable.

Application

Figure 4:
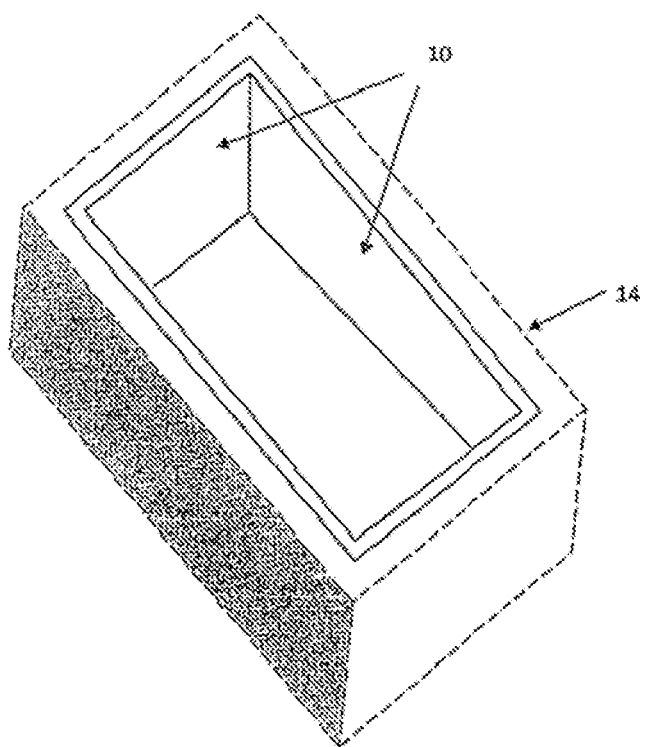
FIG. 4, illustrates the thermal panel in its use condition in accordance with the present invention.

FIG. 4 illustrates, as an example, a series of thermal panels (10) arranged in the internal periphery of a container (14) or bag (not illustrated) for the preservation of temperature. When the temperature of a particular product needs to be preserved, the thermal panels (10) are placed in such a manner that the aluminized film (11) is oriented outwards, that is to say, towards the internal walls of the container (14) or bag. If the container (14) needs to be kept at a high temperature (heat) inside, said panels are placed (10) in the inverse sense, that is to say, the face of the isolating foam plates (13) shall be oriented towards the internal walls of the container (14) or bag.

Novelty of Invention

Upon description of the invention, the contents of the following claims has been claimed as property:

The invention claimed is:

1. A portable, removable, reversible thermal panel made of thermal foam, used as a wall to be placed inside a bag or container, characterized in that, said thermal panel has three temperature isolating layers, in which
    the first layer is an aluminized layer or film that serves as a temperature reflecting film;
    the second layer is a corrugated plastic sheet that serves as a temperature diffuser; and
    the third layer is a temperature isolating foam plate which serves to isolate any change of temperature between an object that has been placed adjacent to the wall inside of the bag or container and an environment which substantially surrounds an outside of the bag or container such that the wall can be reversed depending upon whether the object that has been placed adjacent to the wall is relatively hot or cold.

2. The thermal panel in accordance with claim 1, wherein the three temperature isolating layers isolate temperatures that range from −20° C. to 120° C.

3. The thermal panel in accordance with claim 1, wherein the thermal panel has varied shapes and thicknesses.

4. The thermal panel in accordance with claim 3, wherein the thicknesses of the three temperature isolating layers are varied.

5. The thermal panel in accordance with claim 1, wherein the wall is removed so that the container or bag can be substantially reduced in size.

6. A portable, reversible storage arrangement, comprising:
    a portable storage container having a plurality of walls wherein the container can be substantially reduced in size;
    a reversible thermal panel, wherein the thermal panel further includes;
        an outer reflective panel,
        an outer temperature isolating panel, and
        a temperature diffusing panel located between the outer reflective panel and the outer temperature isolating panel for helping to maintain and preserve a desired temperature of an object located within the portable storage container at a desired temperature range of about −20° C. to 120° C., wherein the outer reflective panel is located substantially adjacent to the object located within the portable storage container when it is desired to keep the object relatively hot and the outer temperature isolating panel is located substantially adjacent to the object located within the portable storage container when it is desired to keep the object relatively cold, and wherein the reversible panel can be removed from the portable storage container when it is desired to have the portable storage container substantially reduced in size.

7. The portable, reversible storage arrangement, in accordance with claim 6, wherein the outer reflective panel is a panel of aluminum foil that is oriented in a face-to-face relationship with an outer wall of the temperature diffusing panel.

8. The portable, reversible storage arrangement, in accordance with claim 6, wherein the outer temperature isolating panel is a foam panel that is oriented in a face-to-face relationship with an opposing wall of the temperature diffusing panel.

9. The portable, reversible storage arrangement, in accordance with claim 6, wherein the storage arrangement is either a storage container or a storage bag.

10. A method of using a portable, reversible storage arrangement, comprising the steps of:

inserting a removable, reversible thermal panel into a portable storage container such that the container can be subsequently; substantially reduced in size, wherein the reversible thermal panel further includes:

an outer reflective panel, an outer temperature isolating panel, and a temperature diffusing panel located between the outer reflective panel and the outer temperature isolating panel for helping to maintain and preserve a desired temperature of an object located within the portable storage container at a desired temperature range of about −20° C. to 120° C.;

determining the desired temperature at which the object located within the portable storage container is to be maintained such that the outer reflective panel is located substantially adjacent to the object located within the portable storage container when it is desired to keep the object relatively hot and the outer temperature isolating panel is located substantially adjacent to the object located within the portable storage container when it is desired to keep the object relatively cold; and removing the thermal panel from the portable storage container when it is desired to have the portable storage container substantially reduced in size.

11. The method, in accordance with claim 10, wherein the method is further comprised of the step of:

orienting the outer reflective panel in a face-to-face relationship with an outer wall of the temperature diffusing panel.

12. The method, in accordance claim 10, wherein the method is further comprised of the step of:

orienting the temperature isolating panel in a face-to-face relationship with an opposing wall of the temperature diffusing panel.

* * * * *